Sept. 5, 1944.  E. G. BAILEY  2,357,300
FUEL BURNING PROCESS AND APPARATUS
Filed July 31, 1940  6 Sheets-Sheet 2

INVENTOR.
Ervin G. Bailey
BY
ATTORNEY.

Sept. 5, 1944.  E. G. BAILEY  2,357,300
FUEL BURNING PROCESS AND APPARATUS
Filed July 31, 1940  6 Sheets-Sheet 3

INVENTOR.
Ervin G. Bailey
BY Joseph P. Moran
ATTORNEY.

Sept. 5, 1944. E. G. BAILEY 2,357,300
FUEL BURNING PROCESS AND APPARATUS
Filed July 31, 1940 6 Sheets-Sheet 4

Fig. 4

INVENTOR.
Ervin G. Bailey,
BY Joseph P. Moran
ATTORNEY.

Sept. 5, 1944.　　　　　E. G. BAILEY　　　　　2,357,300
FUEL BURNING PROCESS AND APPARATUS
Filed July 31, 1940　　　6 Sheets-Sheet 5

INVENTOR.
Ervin G. Bailey
BY Joseph P. Moran
ATTORNEY.

Sept. 5, 1944.　　　　E. G. BAILEY　　　　2,357,300
FUEL BURNING PROCESS AND APPARATUS
Filed July 31, 1940　　　6 Sheets-Sheet 6

Fig. 6

Patented Sept. 5, 1944

2,357,300

UNITED STATES PATENT OFFICE 2,357,300

FUEL BURNING PROCESS AND APPARATUS

Ervin G. Bailey, Easton, Pa., assignor to The Babcock & Wilcox Company, Newark, N. J., a corporation of New Jersey Application July 31, 1940, Serial No. 348,623

19 Claims. (Cl. 122—235)

My present invention relates in general to improvements in processes of burning finely divided solid fuel in suspension and apparatus especially designed and suitable for carrying out such processes. Fuels of the character contemplated by this invention, such as pulverized coal, vary both in physical characteristics and chemical analysis. Coals vary widely in the percentage of inherent moisture, volatiles, fixed carbon and ash, as well as in calorific value. All of these properties influence the burning characteristics of the coal, but probably the one constituent causing the greatest concern in any method of fuel firing is the ash content because of its varying chemical composition and physical characteristics. The problems introduced by ash have long been recognized as important factors in furnace design and operation. Not only does the non-combustible ash add to the cost per B. t. u. delivered at the point of use and aggravate wear and maintenance of fuel preparation and of ash disposal equipment, but its behavior in the furnace due to the formation of slag when subjected to the temperatures of combustion may so alter the character of the substance to be handled as to defeat mechanical methods of removal and as a consequence may seriously interfere with the rate of heat absorption by water cooled surfaces and the maintenance of uniform operating conditions.

Coal ash is by virtue of its origin a heterogeneous mixture of individual constituents each with its own individual fusion characteristics. The ash in the coal comes from three principal sources, that which is in the original vegetable matter; that deposited by sedimentation; and that from precipitation from solutions percolating through the earth. The ashes of all coals however, in passing from the solid to the liquid phase pass through a transition zone defined by three temperature points, usually referred to as (1) Initial deformation temperature,
(2) Softening temperature, and
(3) Fluid temperature.

By chemical analysis coal ash is found to consist essentially of oxides, carbonates, sulphides, sulphates, silicates, and the like of various metals. each with its own individual initial deformation, softening and fluid temperatures. These constituents are usually reported in chemical analysis as silica ($SiO_2$), alumina ($Al_2O_3$), various forms of iron such as metallic iron (Fe), ferrous oxide (FeO), or ferric oxide ($Fe_2O_3$), lime (CaO), and magnesia (MgO). Iron normally is the most variable constituent, and usually accompanied by sulphur forms an appreciably high percentage of the total ash in many coals. Silica and alumina which make up the predominant portion of ash, are in themselves highly refractory. They remain in a solid state at temperatures above the temperature commonly present in combustion apparatus. Lime and magnesia however, and certain compounds of iron when heated to elevated temperatures in the presence of silica and alumina, exhibit active fluxing properties and react with them to form a complex system of silicates and aluminates which have eutectic characteristics with fusion temperatures considerably below the range of the parent substances. This fluxing property of the ash is recognized as the cause of brick work erosion of the silica and alumina fire brick lining of some types of furnace constructions and is especially prevalent in furnaces using coal with ash of high iron content.

When the furnace temperature is above the ash fluid temperature the handling of the resultant molten ash or slag is relatively simple. Similarly when the furnace temperature is below the initial deformation temperature of the ash, the ash will be in a pulverized or "dry" condition and can be easily handled. In the range between the initial deformation and fluid temperatures however, the slag is in a plastic sticky condition, and presents handling problems of substantial difficulty since the slag in this condition adheres to almost any surface with which it comes in contact and will substantially reduce the efficiency of any associated heat absorbing surface and may obstruct the gas flow passages between fluid heating tubes.

The specific initial deformation and fluid temperatures of ash not only vary in ashes of different coals, but the range between these temperatures may also vary quite widely. For example, one coal ash may have a relatively low initial deformation temperature of 2020° F. with a fluid temperature of 2420° F., the range thus being 400° F., while another coal ash may have an initial deformation temperature of 2180° F. and a relatively high fluid temperature of 2860° F., the range in this case being 680° F. A further factor in connection with the physical characteristics of coal ash is that there is a selective separation of ash throughout the length of travel of the burning fuel stream. The various individual ingredients of the heterogeneous ash mixture are not necessarily deposited at the same rate and a greater percentage of the larger and/or denser constituents is more likely to be deposited early in the flow path, resulting in a modification of the composite temperature for the remaining ingredients of the slag at subsequent points.

It has also been recognized in making laboratory fusion tests of coal ash or slag that the nature of the atmosphere in the laboratory furnace, i. e., whether it is oxidizing or reducing in its action, may materially affect the value of the results, to the extent of several hundred ° F. in apparent fusion temperature of the specimen. This has been confirmed by numerous tests of samples and it is found that there is a definite spread of fusion temperature range between the reducing and the oxidizing condition for both the ash as originally in the coal and the slag resulting after combustion. It has also been found that the magnitude of the difference between oxidizing and reducing conditions is comparable for both the coal ash and slag.

I have found that the test samples showing the wider differences for oxidizing and reducing conditions are usually higher in iron content and that there is apparently a functional relationship between the iron content of the ash and the extent to which oxidizing or reducing factors can effect its fusion properties. Iron may exist in the ash and slag in the principal forms with respect to oxidation noted above and its ability to be combined with silica, i. e., its activity as a flux, is greatest when in the ferrous form ($FeO$). The higher oxide ($Fe_2O_3$) does not react appreciably and its presence in a slag constitutes merely the existence of additional components having relatively high individual melting points. Although metallic iron may be formed under highly reducing conditions, and small quantities are found in some slags, the usual conditions of slagging furnace operation have been found most favorable to the production of the ferrous form and consequently to maximum fluxing. The characteristics of the various oxides of iron which tend to modify the slag conditions in a furnace are as follows:

|  | Melting point, °F. | Molecular heat of formation (cal./g. f. w.) | Heat evolved (B. t. u./lb. of iron) |
|---|---|---|---|
| $FeO$ ($Fe=78\%$) | 2,588 | 64,040 | 2,068 |
| $Fe_2O_3$ ($Fe=70.5\%$) | 2,849 | 190,700 | 3,065 |

In my improved method of burning finely divided solid fuel in suspension I am able to beneficially utilize the variation in ash fusing temperatures under oxidizing and reducing conditions, and particularly where the fuel in use has a high iron content in the ash. My improved method is particularly designed for furnaces in which much of the ash content of the fuel is designed for removal in a molten condition.

In the usual methods of burning finely divided coal in suspension the coal and primary air mixture is delivered to the furnace at a temperature usually from 150°–200° F. Preheated secondary air enters at a higher temperature and mixes with the primary air-coal stream. Dehydration and distillation of volatiles rapidly takes place in the particles of coal and combustion of the volatiles and fixed carbon then occurs. When fired downwardly into the furnace, the larger and heavier coal particles tend to drop to the floor, thereby separating a disproportionate percentage of the ash constituents, and some coarser coal. The combustibles burn on the layer of slag on the floor. The coal remaining in suspension burns rapidly and spheres or nodules of free ash form on the surface of the coal particles, some of the ash becoming molten under the existing temperatures and the rest remaining as a dry powder. The bulk of burning coal particles and ash pass on in the gas stream.

As the temperature of the molten slag particles in the gas stream is lowered by radiation to the enclosing heat absorbing surface to a temperature between the initial deformation and fluid temperatures, the slag becomes sticky and will adhere to almost any surface with which it comes in contact and tends to accumulate thereon to undesirable proportions. This not only increases the difficulty of handling the slag, but results in the formation of an insulating layer over whatever heat absorbing surface the slag has adhered to and materially reduces the heat absorbing properties thereof. This disadvantageous condition exists until the temperature of these slag particles in the heating gases falls below the slag initial deformation temperature and the slag is in a solid or dry condition.

In my improved method the period during which the slag is in the range between its fluid condition and solid condition is reduced to a minimum so that the problems due to the presence of slag in a sticky condition are largely obviated. In accordance with my invention, the slag is first subjected to a reducing atmosphere to lower its fluid temperature and thus to increase the fluidity of the slag present and facilitate its handling in that condition. The slag particles carried out of the reducing zone pass into an oxidizing atmosphere whereby the initial deformation temperature of the slag is raised to a substantial extent, thereby rapidly putting all of the slag present into a solid condition and facilitating its removal in that condition. I have applied these basic principles in my improved method of burning finely divided slag forming fuel in suspension in a fluid heater furnace by regulating or proportioning the supply of combustion air to different portions of the furnace to provide a combustion zone having a reducing atmosphere and a subsequent zone between the reducing zone and the main convection heated fluid heating surface having an oxidizing atmosphere.

Although not limited thereto, my improved fuel burning process is particularly adapted for use in steam generating units of the general type shown in my U. S. Patent #2,196,889, granted April 9, 1940, and my pending application Serial No. 253,255, filed January 25, 1939, and I have illustrated and described herein a steam generating unit of this general type which is especially designed for carrying out my process.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

In the drawings I have illustrated somewhat diagrammatically a steam generating unit designed for a capacity of 550,000 pounds of steam per hour at a steam pressure of 2650 pounds per square inch, a constant superheated steam temperature of 940° F., and a constant reheated steam temperature of 900° F. The steam generating unit illustrated has its setting divided into a furnace chamber 10, a laterally spaced convection section 11 connected thereto by an intervening substantially unobstructed vertically elongated passage comprising upflow and downflow sections or "open passes" 12 and 13 respectively. The setting of the unit and each of the chambers therein is preferably of rectangular horizontal cross-section, the setting being defined by a front wall 15, opposite side walls 16, and a rear wall 17. The furnace chamber has an inclined roof 18 and floor 19 and is separated from the upflow passage section 12 except at its lower rear side by a fluid cooled partition wall 20 extending downwardly from the rear end of the furnace roof 18. The upflow and downflow passage sections are separated except at their upper end by a fluid cooled partition wall 21 extending upwardly from the bottom of the setting. The downflow passage section 13 and the convection section 11 are also separated except at their lower ends by a fluid cooled partition wall 22 extending downwardly from the top of the setting. With this division of the setting the heating gases leaving through the lower rear side of the furnace chamber 10 flow upwardly through the passage 12, downwardly through the passage 13, and upwardly through the convection section 11, the upper end of which is connected to an induced draft fan (not shown).

The furnace chamber roof 18 has an elongated burner port extending transversely thereof adjacent the front wall 15 which communicates with a combustion air box 25 having a series of dampers 26 controlling the supply of air therethrough. A multiplicity of pulverized coal burner nozzles 27 of a suitable turbulent type are mounted in the air box 25 so as to discharge streams of primary air and pulverized coal in suspension downwardly into the furnace chamber 10. The vertical walls, floor and roof of the furnace chamber are entirely fluid cooled as indicated by steam generating tubes to permit the walls to withstand the maintenance therein of a high normal mean temperature. The furnace chamber cooling tubes are connected at their upper ends so as to discharge into a steam and water drum 28 extending transversely across the upper part of the setting. A normally open slag outlet opening 29 is provided in the furnace chamber floor 19 through which molten slag from the furnace chamber 10 and upflow gas passage 12 may continuously discharge into suitable slag receiving means.

Figure 1:
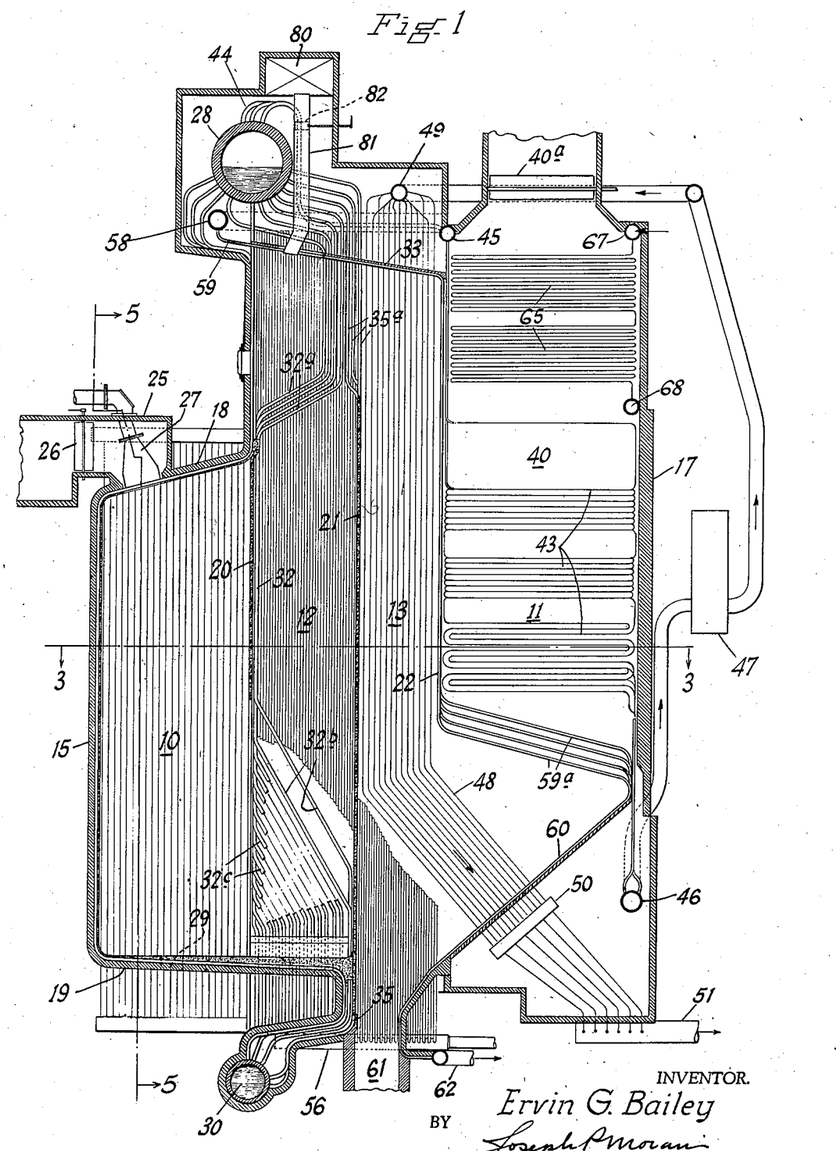
Fig. 1 is a somewhat diagrammatic sectional elevation of a steam generating unit embodying my invention taken on the line 1—1 of Fig. 3.
Figure 2:
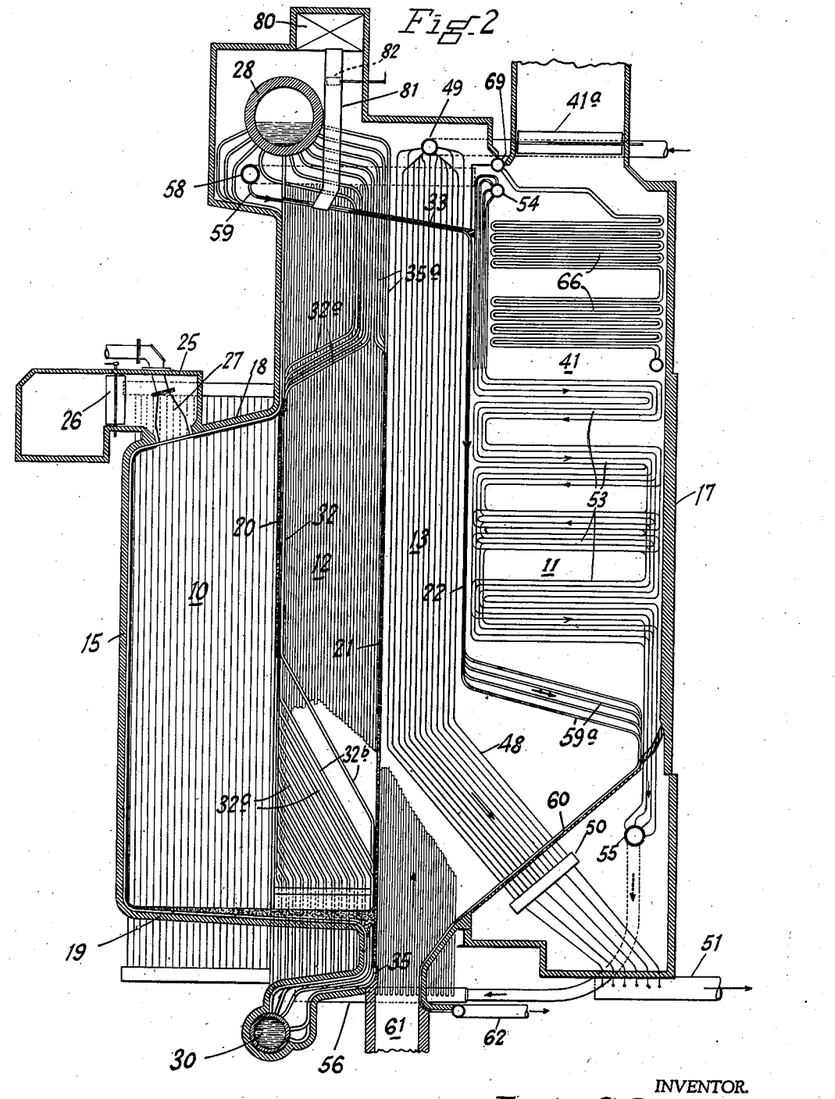
Fig. 2 is a view similar to Fig. 1 taken on the line 2—2 of Fig. 3.
Figure 5:
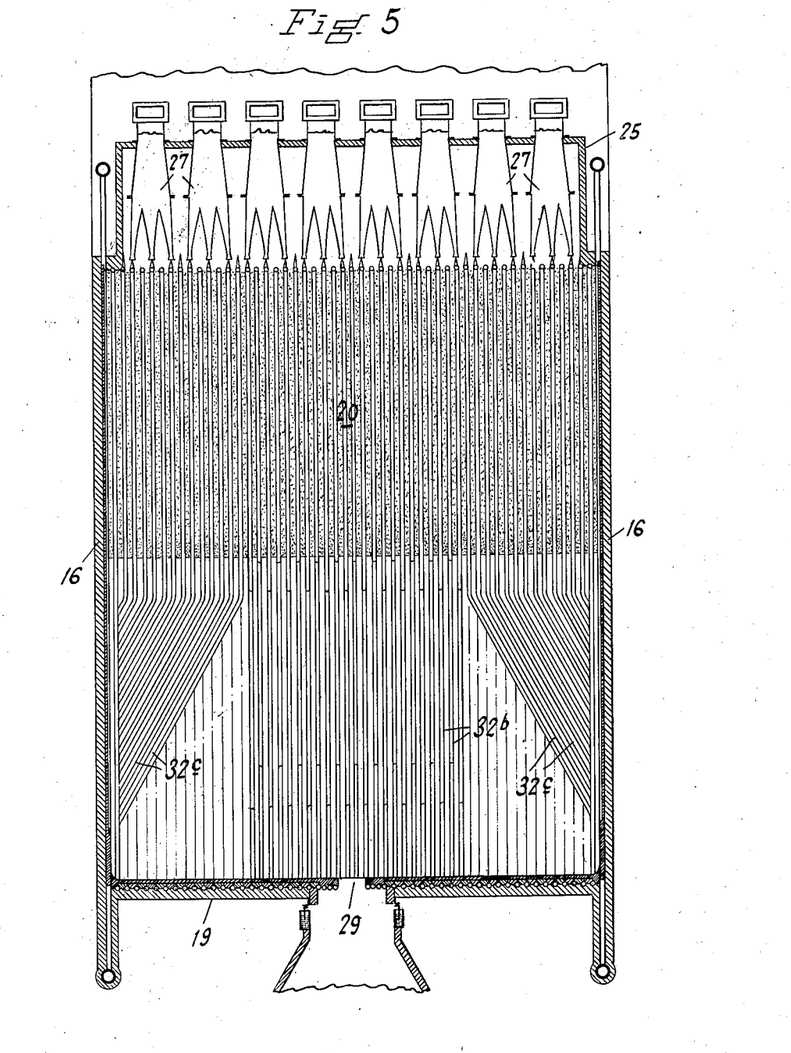
Fig. 5 is a vertical section taken on the line 5—5 of Fig. 1.

The steam generating surface consists substantially entirely of tubes heated mainly by radiation and located in the portion of the setting occupied by the furnace chamber 10 and upflow passage 12. A transverse lower water drum 30, connected to the drum 28 by large diameter external downcomers 31, serves as a water supply to the steam generating tubes lining the boundary surfaces of the furnace chamber and the front and rear sides of the upflow gas passage. The partition 20 is formed and fluid cooled by a row of tubes 32, the portions of which defining the partition are of vertical studded sections covered with refractory to close the intertube spaces. The portions 32$^a$ of the tubes 32 above the partition 20 are bent outwardly in spaced relation into the gas passage 12 and then vertically through the roof section 33 defining the top of the upflow and downflow passages, and connected to the drum 28. The intermediate tubes 32 in the row have their portions 32$^b$ below the partition 20 bent rearwardly across the lower portion of the passage 12 to the lower part of the partition 21, alternate tubes being bent in vertically spaced relation to define an inclined tube screen extending across the lower portion of the passage 12, as shown in Figs. 1, 2 and 5. The tubes 32 at each side of the center section have their lower portions 32$^c$ bent laterally in the plane of the partition 20 until adjacent the corresponding side wall 16 whereupon they extend rearwardly in parallel relation and downwardly to a supply header. Another row of tubes 35 extends from the drum 30 along the partition wall 21, with tube portions 35$^a$ above the upper end of the partition wall bent and arranged to form a tube screen between the upflow and downflow passages 12 and 13 respectively. The partition 21 is defined by studded portions of the tubes 35 and intervening refractory carried thereby.

Figure 3:
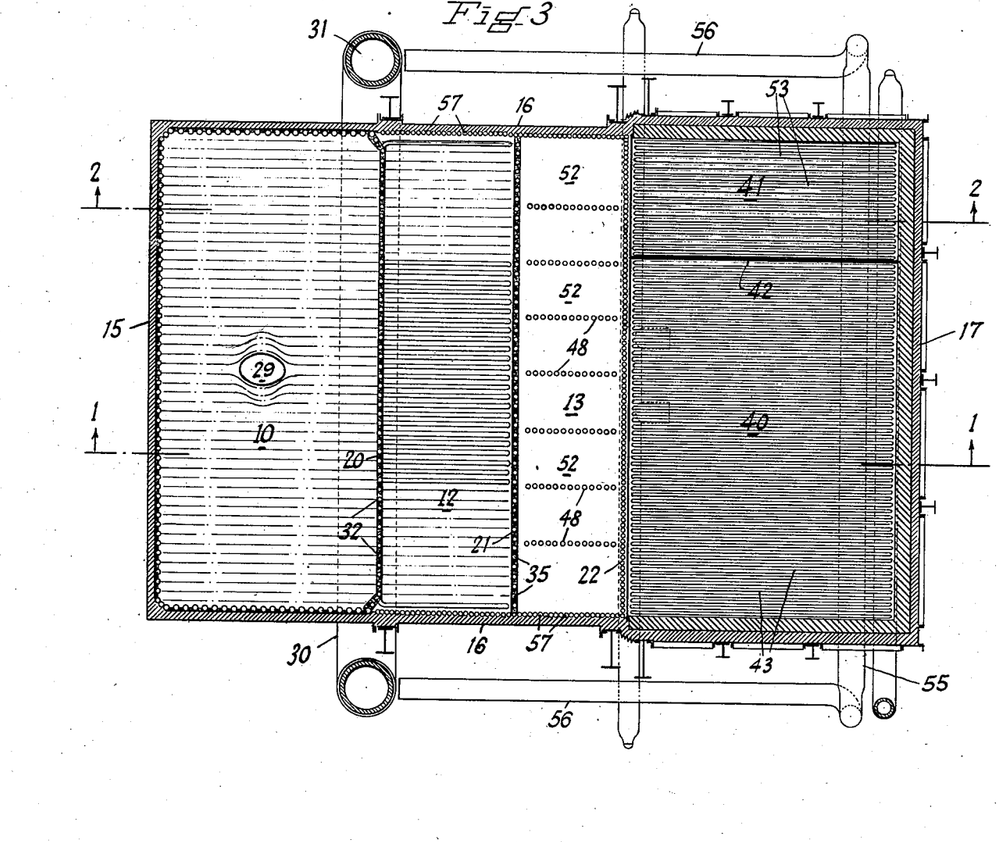
Fig. 3 is an enlarged horizontal section taken on the line 3—3 of Fig. 1.
Figure 4:
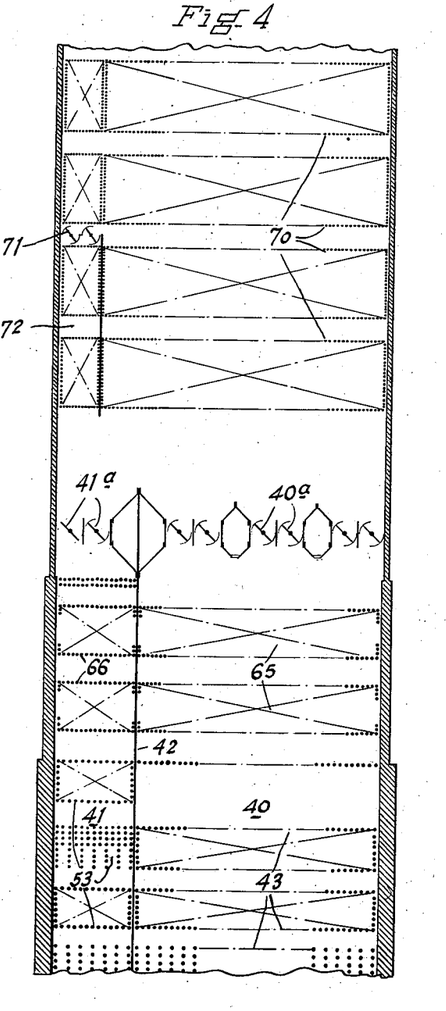
Fig. 4 is a transverse section through the convection heat absorbing section.

The steam superheating and reheating requirements of the steam generating unit illustrated necessitate a large part of the heat absorbing surface of the unit. As shown in Figs. 3 and 4 the convection section 11 is divided into a pair or laterally adjoining passages 40 and 41 by a vertical partition 42. The passages have sets of control dampers 40$^a$ and 41$^a$ respectively at their upper ends for proportioning the heating gas flow therethrough. The passage 40 is of much larger flow area than the passage 41 and contains superposed serially connected banks of horizontally extending closely spaced superheater tubes 43 receiving saturated steam from the drum 28 through tubes 44 and a superheater inlet header 45. The lower ends of the tubes in the lowest superheater tube bank discharge into a common header 46 through which the steam flows to a regulable desuperheater or attemperator 47 externally of the unit. The superheater tube banks 43 constitute the convection section of the superheater. The superheater also includes a substantial amount of radiant heat absorbing surface consisting of transversely spaced tube groups 48 in the downflow passage 13 extending downwardly from a common inlet header 49 above the roof section 33. The header 49 is connected to the steam outlet side of the desuperheater. The lower end of each superheater tube group extends rearwardly at an angle and connects with an external header 50. All of the headers 50 are connected to a common discharge header 51. The tube groups 48 thus constitute the radiant section of the superheater and divide the downflow passage 13 into a series of vertically elongated parallel passages 52.

The steam reheating surface is likewise divided into convection and radiant sections, the convection section consisting of a series of vertically spaced horizontally arranged serially connected tube banks 53 located in the by-pass passage 41 and receiving their steam supply from an inlet header 54, with the lowermost reheater bank discharging to an outlet header 55. The reheated steam flows from the header 55 to headers 56 located below the side wall portions defining the sides of the upflow and downflow passages 12 and 13. The reheater radiant section is partly formed by rows of tubes 57 extending from the headers 56 along the side walls of the two passages to an upper header 58, as shown in Fig. 2. The header 58 is in turn connected to a row of tubes 59 which extend downwardly along the roof section 33, partition wall 22 and across the lower end of the convection pass 11 in staggered spaced relation to define a tube screen 59a thereacross. After forming the tube screen, the tubes 59 are again brought into alignment and extend downwardly to define a fluid cooled inclined bottom 60 for the convection section. The tube row 59 extends downwardly to define the rear side of a hopper 61 which receives the ash separated from the gases in the downflow passage and convection section. The tubes 59 finally terminate in a reheater outlet header 62.

The unit also includes a substantial amount of economizer surface formed by superposed horizontally arranged serially connected tube banks 65 in the main convection passage 40 and similar sections 66 in the corresponding portion of the by-pass passage 41. An economizer inlet header 67, intermediate header 68, and outlet header 69 are connected to the tubes to provide a downflow of water through the sections 65 and an upflow through the sections 66 with the header 69 discharging to the drum 28.

A tubular air heater consisting of a series of vertically spaced horizontally arranged tube banks 70 is located in the convection section 11 above the level of the control dampers 40a and 41a and serves as a source of preheated air under pressure. Control dampers 71 may be used to regulate the amount of heating gases passing across the air heater tubes located in a small by-pass passage 72 at one side of the air heater. The air heater outlet duct is connected to the fuel burners 27 and wind box 25 to provide preheated primary and secondary air supplies respectively thereto.

The air heater outlet duct is also connected to a horizontal duct 80 extending across the top of the setting above the steam and water drum 28. The duct 80 has a series of small discharge ducts 81, having individual control dampers 82, connected thereto with the lower ends of the ducts 81 extending between the reheater tubes 59 along the roof section 33 at a point in front of the tube screen 35a between the upper ends of the upflow and downflow passages 12 and 13 respectively. With this arrangement a regulable amount of tertiary air can be supplied to the upper end of the upflow pass 12 in a series of transversely spaced streams directed downwardly in front of the tube screen to mix thoroughly with the ascending heating gases.

In the usual method of burning pulverized coal in a steam generating unit of the general character described, but without the tertiary air supply ducts 81, all of the air supplied to the unit for combustion purposes, i. e., the theoretical amount required for combustion and a suitable excess of say 15 or 20%, would be supplied to the primary furnace chamber 10 as primary and secondary combustion air so that the atmosphere in the furnace chamber 10 would be definitely oxidizing. The furnace chamber volume and heat absorbing surface would be proportioned to permit the maintenance of a normal mean temperature above the ash fluid temperature so that the ash separating in the furnace chamber 10 would deposit on the floor 19 in a fluid condition and flow out through the slag opening 29. The heating gases with a certain amount of slag particles in suspension would leave the furnace chamber 10 through the opening below the partition 20 and flow upwardly through the upflow passage 12. The ash or slag particles in suspension would be cooled to some extent in this section and the slag separated therein would drop or flow down the subjacent portion of the floor 19 and be discharged through the slag opening 29. The walls of the primary furnace chamber 10 and upflow passage 12 would be coated with slag in a fluid condition which would flow downwardly thereon to the floor 19. The heating gases and remaining slag particles in suspension would pass through the screen 35a and then downwardly through the downflow passage 13, being progressively cooled by radiation to the surrounding heat absorbing surface. The amount of cooling surface would be designed so that the slag particles would be in the plastic or sticky range between the initial deformation and fluid temperatures while in the downflow passage 13. It would be intended that the slag particles should be in a dry or solid condition by the time they reach the gas turning space below the lower ends of the downflow passage and convection section, so that on contacting with the closely spaced tubes in the convection section, the slag particles if depositing thereon could be relatively easily removed therefrom. The slag particles separated in the downflow passage and convection section would fall onto the inclined floor 60 or directly into the hopper 61.

The method of operation described thus would provide for the maintenance of exceedingly high temperatures in the furnace chamber 10 to insure the slag separating therein to be in a molten condition to facilitate its removal and the progressive cooling of the heating gases and suspended slag particles leaving the furnace chamber while passing through the upflow and downflow passages, so that when reaching the convection section, the heating gases would theoretically be at a temperature to which the superheater tubes can be safely exposed and the slag particles at a temperature such as to insure the slag being in a solid condition to permit removal of separating slag through the hopper 61.

In accordance with my improved method of burning finely divided fuel in suspension, substantially the same total amount of combustion air is supplied as heretofore used, but the air supply to the unit is divided in such a manner that the conditions existing in the furnace chamber 10 and upflow pass 12 will be "reducing" and the conditions in the downflow pass 13 and convection section 11 will be "oxidizing," as defined herein. The supplies of primary, secondary and tertiary air can be readily proportioned by means of the control dampers described so that, for example, the total amount of primary and secondary air supplied to the furnace chamber 10 will be approximately or slightly more than the theoretical air requirements with the remaining air supplied through the tertiary air ducts 81 at the top of the upflow pass. The maintenance of a reducing condition in the furnace chamber 10 involves two important changes in operating conditions, first, a reduction in the fluid temperature of the slag depending upon the amount of iron present in the slag, and secondly, an increase in the adiabatic temperature, since with the same amount of fuel burned in the same space with a decreased amount of combustion air, there will be equivalent heat liberation with a smaller resulting gas mass. A decrease in slag fluid temperature tends to increase the fluidity and thus reduce the thickness of the deposited slag on the furnace walls and also the effective temperature of that surface. The heat absorption of the furnace chamber walls will therefore be increased not only because of the reduced slag liquid temperature but also because of the increased temperature difference between the adiabatic and slag liquid temperatures. Due to this increase in heat absorbing capacity of the furnace walls, the gases leaving the furnace and entering the upflow pass will be at a lower temperature and the operation in the upflow pass will be at a correspondingly lower temperature level.

The addition of tertiary air between the upflow and downflow passes has three results; first, the maintenance of an oxidizing atmosphere in this portion of the unit which will cause a rise in the initial deformation temperature of the slag depending upon the iron content of the slag, so that the slag can be in a solid or dry condition at a correspondingly higher temperature; second, combustion of any remaining combustibles in the gases will be rapidly completed because of the addition of air and the effective mixing provided by the screen tube portions 35a immediately after the tertiary air is admitted to the gas stream; and third, the addition of tertiary air at a considerably lower temperature than the gas stream will cause a further reduction in the gas temperature which will more than compensate for the additional heat supplied to the gases by the secondary combustion taking place and by the exothermic reaction of the oxidation of ferrous oxide FeO) to ferric oxide (Fe2O3), which amounts to approximately 1000 B. t. u. per pound of iron.

The rapid change in the atmosphere of the gas flow path through which the slag particles are passing from reducing to oxidizing and the consequent increase in the slag initial deformation temperature in conjunction with the reduction of the heating gas temperature due to the dilution by tertiary air have the net effect of reducing the period of time and the part of the flow path in which the slag is in a plastic or sticky condition and definitely insures that the temperature of the slag on reaching the convection section will be below the slag initial deformation temperature. The furnace chamber 10 and upflow pass 12 thus constitute the reducing zone of the unit, while the downflow pass 13 and the convection section 11 constitute the oxidizing zone. The high downward gas velocity added to gravity causes any ash accumulation on the walls of the downflow pass, which ash will normally be in a spongy condition, to drop into the hopper 61. The greater cleanliness of the heat absorbing surface in the downflow pass permits higher rates of heat absorption in this section than in the upflow pass, even though the heating gas temperatures in the latter pass are higher, with a resultant lower temperature of the gases entering the convection section.

Figure 6:
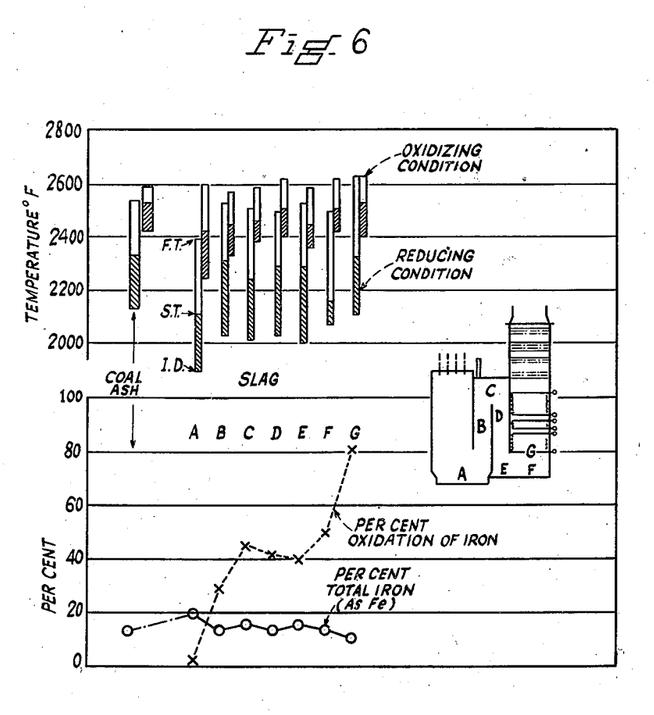
Fig. 6 is a diagram of slag conditions in a steam generating unit operated in accordance with the invention.

In Fig. 6 is diagrammatically illustrated the temperature range under both oxidizing and reducing conditions of the coal ash and of the slag, the iron content and the percentage of oxidation of the iron in the slag, from different parts of a steam generating unit of the general type disclosed herein. The unit was fired with Pittsburgh slack coal having about 13% iron (as Fe) in the ash. The combustion air was divided so that practically the theoretical amount of air was supplied to the primary furnace chamber, and about 10% excess air added at the top of the upflow gas passage. Because of the small amount of excess air in the primary furnace, it was possible to obtain a high adiabatic temperature, a slag with its iron content largely reduced to effect a low slag fluid temperature, and a resulting high rate of heat transfer. By burning out the unburned carbon particles in the furnace gases and oxidizing the iron in the ash in suspension by the time the gases reached the superheater at G, the ash had higher initial deformation and fluid temperatures. The slag tapped at A was high in iron content, while that collected in a dry state at G was actually lower in iron content that the original coal ash. The degree of oxidation was practically zero in the tapped slag, i. e., 95% or more of the iron was FeO. At C, D and E the oxidation was about 40%, the curve holding rather flat, because there was a carbon deposit at the top or bottom of every turn where the coarse coal or ash particles tend to be thrown out. As the gases reach the point G, practically all the iron content was oxidized and the slag particles were in a dry solid condition.

Whereas up to the present time high ash coals containing high percentages of iron in the ash have been regarded as definitely undesirable for use as fuels in steam generating units and the like, my improved method of operation makes a high iron content in the coal ash a definite asset and an effective medium of regulation of furnace operating conditions. Not only good combustion conditions are obtained, but also good ash conditions for high rates of heat transfer and minimum stoppage of gas passages by slag.

The words "reducing" and "oxidizing" are used herein to define zones in which the conditions maintained are such as to promote the formation of FeO and Fe2O3 respectively of the iron content in the ash or slag.

The steam generating unit described is designed to permit the maintenance of constant superheat and reheat temperatures over a wide range of steam generating capacities, i. e., from 300,000–550,000 pounds of steam per hour. The primary regulation of these temperatures is by varying the position of the control dampers 40a and 41a to control the heating gas flow through the parallel passages in the convection section. A further control of the superheat temperature is had by regulation of the operation of the desuperheater 47 in response to a variable steam condition, such as the steam outlet temperature.

A further control of both the superheat and reheat steam outlet temperatures is had in accordance with my invention by varying the distribution of the combustion air between the primary furnace 10 and the tertiary air ducts 81 by means of the corresponding control dampers. This control is exercised to vary the temperature of the heating gases to which the radiant heat absorbing sections of the superheat and reheat surface are exposed; the total volume of gases entering the convection section will be substantially the same whether all of the combustion air is delivered to the primary furnace or part to the tertiary air ducts, so that the heating of the convection section of the superheater and reheater can be regulated by the dampers 40ᵃ and 41ᵃ in a known manner.

With all of the air admitted into the primary furnace 10 resulting in an oxidizing atmosphere therein, due to the higher fusing temperature of the slag there will be the greatest thickness of heat insulating slag layer on the walls, the lowest adiabatic temperature, and a minimum of heat transfer to the wall tubes, so that the gases leaving the furnace 10 and upflow passage 12 will have a maximum temperature. With a sufficient proportion of the air admitted as tertiary air through the ducts 81 however to provide a reducing atmosphere in the primary furnace and upflow passage as defined herein, the described conditions of a thinner layer of insulating slag and a higher adiabatic temperature will be present, and due to the greater heat transfer, the gases leaving the primary furnace will have a substantially lower temperature. The entrance of the relatively low temperature tertiary air at the top of the upflow passage provides a further lowering of the gas temperature to which the superheater and reheater radiant portions in the downflow passage are exposed. At low steam outputs of the unit, the control procedure would involve having all of the air admitted to the primary furnace, and as the rating of the unit was increased, the air admission would be modified so that the maximum tertiary air admission would occur at the highest ratings. In view of the practical limits of steam temperature control of each of the control methods described herein, the combination thereof in a single steam generating unit with steam heating surface having serially connected radiant and convection sections permits the desired wide range of control operations.

While in accordance with the provisions of the statutes I have illustrated and described herein the best form of the invention now known to me, those skilled in the art will understand that changes may be made in the method and in the form of the apparatus disclosed without departing from the spirit of the invention covered by my claims, and that certain features of my invention may sometimes be used to advantage without a corresponding use of other features.

I claim:

1. The method of burning a slag-forming fuel which comprises burning the fuel in suspension in a high temperature combustion zone with only sufficient air to provide a reducing atmosphere sufficient to insure a fluid condition of the slag particles separating from the burning fuel stream therein, removing the separated slag from the combustion zone in a fluid condition, subjecting the slag particles carried out of the combustion zone by the heating gases generated, to an oxidizing atmosphere sufficient to raise the initial deformation temperature of slag therein above the temperature of the slag particles in suspension, and separately removing slag particles thereby solidified from the heating gases in a solid condition.

2. The method of burning a slag forming solid fuel which comprises introducing the fuel in a finely divided condition into a high temperature main combustion zone, supplying combustion air to the combustion zone in an amount maintaining atmospheric conditions therein minimizing oxidation of any fluxing ash constituent of the fuel to insure fluidity of the slag particles separating from the burning fuel, removing the slag separated therein in a fluid condition, supplying air to the heating gases leaving the main combustion zone to effect oxidation of the fluxing ash constituent and solidification of the slag particles in the heating gases, and separately removing solidified slag particles from the heating gases in a solid condition.

3. The method of burning a slag forming fuel in a fluid heater having a bank of convection heated fluid heating tubes which comprises burning the fuel in suspension in a high temperature combustion chamber under a reducing atmosphere sufficient to insure a fluid condition of the slag particles separating from the burning fuel stream and to permit the removal of the separated slag from the combustion chamber in a fluid condition, subjecting the slag particles carried out of the combustion chamber by the heating gases generated, to an oxidizing atmosphere sufficient to raise the slag initial deformation temperature therein above the temperature of the slag particles in suspension before the gases contact with the convection heated fluid heating tubes, and separately removing solidified slag particles from the heating gases in a solid condition.

4. The method of burning a slag forming solid fuel having a high iron content in the ash which comprises introducing the fuel in a finely divided condition into a high temperature combustion zone, supplying combustion air to the combustion zone in an amount sufficient to burn the fuel in suspension and maintain atmospheric conditions therein restricting oxidation of the iron content of the ash to insure fluidity of the slag particles separating therein from the burning fuel, removing the slag separated in the combustion zone in a fluid condition, and supplying air to the heating gases after leaving the combustion zone in an amount sufficient to increase oxidation of the iron content of the ash and effect solidification of the slag particles in suspension in the heating gases.

5. The method of burning a slag forming solid fuel having a high iron content in the ash which comprises introducing the fuel in a finely divided condition into a high temperature combustion zone, supplying substantially all of the combustion air directly to the combustion zone in an amount sufficient to burn the fuel in suspension and maintain temperature and atmospheric conditions therein restricting oxidation of the iron content of the ash to insure fluidity of the slag particles separating therein from the burning fuel, removing the slag separated in the combustion zone in a fluid condition, supplying the remaining part of the combustion air directly to the heating gases after leaving the combustion zone in an amount sufficient to increase oxidation of the iron content of the ash and effect solidification of the slag particles in suspension in the heating gases before the gases contact with convection heated fluid heating surface, and separately removing solidified slag particles before the gases contact with convection heated fluid heating surface.

6. The method of burning a slag forming solid fuel having a high iron content in the ash which comprises introducing the fuel in a finely divided condition into a high temperature combustion zone, supplying part of the combustion air directly to the combustion zone in an amount sufficient to burn the fuel in suspension and maintain temperature and atmospheric conditions therein favoring a ferrous formation of the iron content of the ash to insure fluidity of the slag particles separating therein from the burning fuel, removing the slag separated in the combustion zone in a fluid condition, and supplying the remaining part of the combustion air directly to the heating gases after leaving the combustion zone in an amount sufficient to effect a ferric formation of the iron content of the ash and permit the removal of slag particles in suspension in the heating gases in a solid condition before the gases contact with convection heated fluid heating surface.

7. A fluid heater comprising a setting including a furnace chamber and a convection fluid heating section spaced from the furnace chamber, a substantially unobstructed connecting passage having its opposite ends connected to said furnace chamber and convection section respectively, means for burning slag forming fuel in suspension in said furnace chamber under a reducing atmosphere to insure the production of a molten slag, a slag outlet in the lower part of said furnace chamber, a bank of fluid heating tubes extending across the gas flow path in said convection section, means for maintaining an oxidizing atmosphere in said connecting passage and convection section to raise the slag initial deformation temperature, and a separate ash hopper below the convection section end of said connecting passage.

8. A fluid heater comprising a setting including a furnace chamber and a convection fluid heating section spaced laterally from the furnace chamber, an inverted U-shaped substantially unobstructed connecting passage having upflow and downflow sections with their lower ends connected to the lower portions of said furnace chamber and convection section respectively, means for burning slag forming fuel in suspension in said furnace chamber under a reducing atmosphere, a slag outlet in the lower part of said furnace chamber, a bank of fluid heating tubes extending across the gas flow path in said convection section, and means for maintaining an oxidizing atmosphere in said downflow passage section and convection section.

9. A fluid heater comprising a setting including a furnace chamber and a convection fluid heating section spaced laterally from the furnace chamber, an inverted U-shaped substantially unobstructed connecting passage having upflow and downflow sections with their lower ends connected to the lower portions of said furnace chamber and convection section respectively, means for burning slag forming fuel in suspension in said furnace chamber under a reducing atmosphere sufficient to lower the slag fusion temperature below the furnace chamber temperature, a slag outlet in the lower part of said furnace chamber, a bank of fluid heating tubes extending across the gas flow path in said convection section, and means for maintaining an oxidizing atmosphere in said downflow passage section and convection section including means for regulably supplying air directly to the heating gases generated after passing out of said furnace chamber.

10. A steam generator comprising a setting including a furnace chamber and a convection fluid heating section spaced laterally from the furnace chamber, an inverted U-shaped substantially unobstructed connecting passage having upflow and downflow sections with their lower ends connected to the lower portions of said furnace chamber and convection section respectively, means forming a tube screen separating said upflow and downflow passage sections, means for burning slag forming fuel in suspension in said furnace chamber under a reducing atmosphere, a slag outlet in the lower part of said furnace chamber, a bank of fluid heating tubes extending across the gas flow path in said convection section, and means for maintaining an oxidizing atmosphere in said downflow passage section including means for supplying air to the heating gases at a point at the furnace chamber side of said tube screen.

11. The method of superheating steam which comprises passing the steam to be superheated first through convection heated surface and then through radiantly heated surface, and controlling the temperature of the steam passing to the radiantly heated surface partly by regulating the amount of heating gases contacting with the convection heated surface and partly by desuperheating the steam after passing through the convection heated surface, and controlling the outlet temperature of the steam leaving the radiantly heated surface by regulating the distribution of the combustion air supplied between a point where the fuel enters an associated furnace and a point spaced from said point of fuel entry to vary the temperature of the gases to which the radiantly heated surface is exposed while maintaining the same rate of fuel supply to the associated furnace.

12. The method of superheating steam which comprises passing the steam to be superheated first through convection heated surface and then through radiantly heated surface, and controlling the temperature of the steam passing to the radiantly heated surface by regulating the amount of heating gases contacting with the convection heated surface, and controlling the outlet temperature of the steam leaving the radiantly heated surface by regulating the distribution of the combustion air supplied between a point where the fuel enters an associated furnace and a point spaced from said point of fuel entry to vary the temperature of the gases to which the radiantly heated surface is exposed while maintaining the same rate of fuel supply to the associated furnace.

13. The method of superheating steam in a radiantly heated superheater exposed to and receiving heat by radiation from heating gases from an associated furnace having water cooled walls burning a slag forming fuel in suspension under slagging temperatures which comprises regulating the temperature of the heating gases to which the superheater is exposed by varying the fuel-combustion air ratio to the furnace to control the slag fusion temperature and furnace adiabatic temperature, and thereby the thickness of the slag layer on the water cooled furnace walls.

14. The method of superheating steam in a radiantly heated superheater exposed to and receiving heat by radiation from heating gases from an associated furnace having water cooled walls burning a slag forming fuel in suspension under slagging temperatures which comprises regulating the temperature of the heating gases to which the superheater is exposed by varying the fuel-combustion air ratio to the furnace to control the slag fusion temperature, and thereby the thickness of the slag layer on and rate of heat transfer to the water cooled furnace walls.

15. The method of superheating steam in a radiantly heated superheater exposed to heating gases from an associated fluid cooled furnace burning a slag forming fuel in suspension under slagging temperatures which comprises regulating the temperature of the heating gases to which the superheater is exposed partly by varying the fuel-combustion air ratio to the furnace to control the slag fusion temperature, and thereby the thickness of the slag layer on the furnace walls, and partly by supplying additional air to the heating gases before the gases reach the superheater.

16. A steam generator comprising a setting including a furnace chamber and a convection section spaced laterally from the furnace chamber, an inverted U-shaped substantially unobstructed connecting passage having upflow and downflow sections with their lower ends connected to the lower portions of said furnace chamber and convection section respectively, means for burning fuel in said furnace chamber, a partition arranged to divide said convection section into a pair of upflow passes, control dampers for said passes, a steam superheater having a convection heated section located in one of said upflow passes and a serially connected radiant section subdividing said downflow passage section into parallel passes, and a steam reheater having a convection heated section located in the other upflow pass and a serially connected radiant section forming part of the boundary wall of said downflow passage section.

17. A steam generator comprising a setting including a furnace chamber and a convection section spaced laterally from the furnace chamber, an inverted U-shaped substantially unobstructed connecting passage having upflow and downflow sections with their lower ends connected to the lower portions of said furnace chamber and convection section respectively, means for burning a slag-forming fuel in suspension in said furnace chamber including means for supplying combustion air thereto, a partition arranged to divide said convection section into a pair of upflow passes, control dampers for said passes, a steam superheater having a convection heated section located in one of said upflow passes and a serially connected radiant section subdividing said downflow passage section into parallel passes, a steam reheater having a convection heated section located in the other upflow pass and a serially connected radiant section forming part of the boundary wall of said downflow passage section, and a regulable air inlet positioned adjacent the upper end of said downflow passage section.

18. The method of burning a pulverized solid fuel containing slag-forming constituents which comprises burning the fuel in suspension in a combustion zone under temperatures above the fluid temperature of the slag particles separating from the burning fuel stream, removing the separated slag from the combustion zone in a fluid condition, subjecting the slag particles remaining in suspension in the heating gases generated to an oxidizing atmosphere to an extent sufficient to raise the initial deformation temperature of slag therein above the temperature of the slag particles in suspension therein, and separately removing slag particles thereby solidified from the heating gases in a solid condition.

19. The method of burning a pulverized fuel containing slag-forming ash constituents having predetermined initial deformation and fluid temperatures, which comprises burning the fuel in suspension in a combustion zone under temperature conditions approximating the ash deformation range, supplying the combustion air required to successive portions of the combustion zone in amounts lowering the fluid temperature of the slag-forming ash constituents while in suspension in an initial portion of the combustion zone and raising the initial deformation temperature of the slag-forming ash constituents while in suspension in a subsequent portion of the combustion zone, whereby the temperature range in which slag particles are in a sticky condition is correspondingly reduced, removing slag in a fluid condition from the initial portion of the combustion zone, and separately removing slag in a solidified condition from the subsequent portion of the combustion zone.

ERVIN G. BAILEY.